Figure 1:
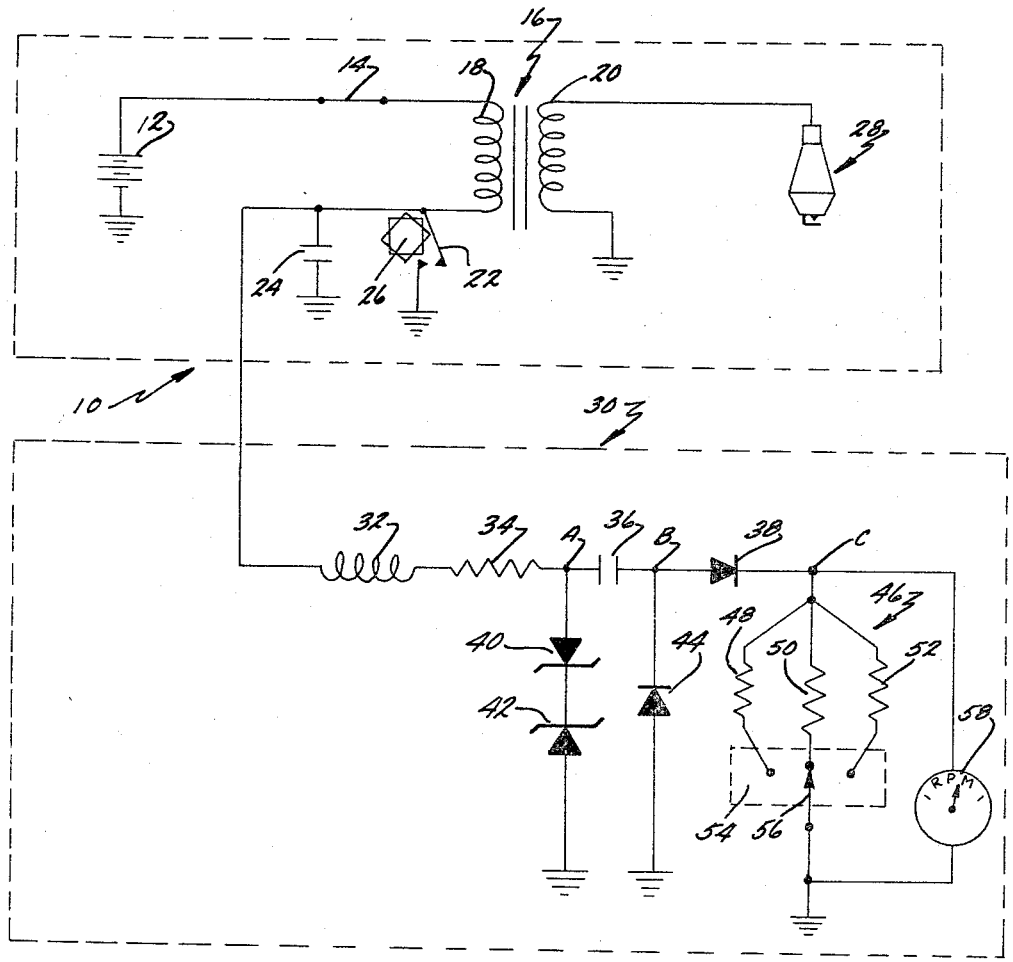

May 30, 1967   D. G. PASSMORE   3,323,052
AUTOMOTIVE TACHOMETER WITH SINGLE RESISTIVE ELEMENT
RANGE AND CALIBRATION DEVICE
Filed Sept. 30, 1964

INVENTOR.
DAVID G. PASSMORE
BY Price & Heneveld

ATTORNEYS

United States Patent Office 3,323,052
Patented May 30, 1967

---

3,323,052
AUTOMOTIVE TACHOMETER WITH SINGLE RESISTIVE ELEMENT RANGE AND CALIBRATION DEVICE
David G. Passmore, Comstock Park, Mich., assignor to Carpenter Corporation, Muskegon, Mich., a corporation of Michigan
Filed Sept. 30, 1964, Ser. No. 400,319
3 Claims. (Cl. 324—70)

This invention relates to tachometers, and more particularly to tachometers for indicating the speed in revolutions per unit time of various types of internal combustion engines, especially those used in motor vehicles.

Several different kinds of engine tachometers have been developed in the past for providing to the operators of motor vehicles, aircraft, or other like machines a continuous visual indication of the speed of the engine. This is often more important to the operator than the speed of the craft being propelled by the engine. Such prior tachometers include two basic types of device. These are the mechanical tachometer, which is actuated by a flexible, rotatable, shaft driven directly by the engine itself, and the electrical tachometer, which has no direct mechanical drive connection with the engine. It is operated by electrical impulses which in one manner or another are representative of engine speed.

The basic difficulty with the mechanical instrument is that if the manufacturer of the engine and its associated mechanical accessories and fittings does not make provision for the tachometer drive, it is very difficult to later add the same, since this normally requires structural alteration of the engine block casting. The electrical type of tachometer is much more suitable for this type of installation, since only minor changes are require to install the necessary additional items of equipment upon the engine. The actuating electrical impulses for these devices are generally taken from a source already in existence, such as for example the ignition system, since the sparks produced for firing the engine cylinders occur in a definite and unchanging relationship relative to the speed of the engine.

The electrically-operated tachometers have always involved difficulties, however, for several different reasons. In the first place, they often interfere with the efficiency and operation of the ignition system with which they are used. Again, such tachometers are required to be indilvidually designed and manufactured for a wide variety of installations, since no single device could be used on engines having more than a single given number of cylinders. Thus, if an electrical tachometer designed for a four-cylinder engine were used on a six or an eight-cylinder engine, its reading would necessarily be erroneous, since the ignition system of each of these types of engine creates electrical pulses at a rate different than that of the others. Regardless of whether a particular tachometer measured the frequency of these pulses or their average value, the resulting reading would always be incorrect when used upon any engine other than the one for which it was specifically designed.

Similarly, even between engines having the same number of cylinders, the electrical circuitry of conventional tachometers was operative only for one given polarity. Since in the automotive and other motorized vehicle industries one manufacturer uses a negative ground system whereas another uses a positive ground system, a given tachometer designed for a particular engine will not operate correctly when used upon another engine having the same number of cylinders, but utilizing the opposite polarity in its ignition system. Moreover, since many types of vehicles now use twelve volt systems while many others continue to use six volt systems, still another vital difference exists even between engines having the same number of cylinders and the same polarity of ignition system. This also affected the tachometer's accuracy.

Thus, although electrical tachometers are the only type practical for accessory or after-market installations, dealers in these systems are required to inventory many different kinds in order to satisfy all customers. Such a situation requires the outlay of large sums to assure an adequate stock. Also, warehousing or such an inventory is wasteful of considerable valuable storage space. What usually happens in such cases is that the various dealers stock only a few of the more commonly used types. When a customer requires a certain type not in stock, the buyer is obliged to wait while the dealer special orders it from a warehouse.

The present invention has for its principal objectives a complete solution of these difficulties. Accordingly, the invention provides an electrical tachometer which is truly universal, which may be used with entirely accurate results on engines having any of the conventional numbers of cylinders. Furthermore, the present tachometer may be used on engines without regard to the particular polarity of the electrical circuitry used with the engine, and also without regard to the particular magnitude of the supply voltage used in the system. What is more, the invention in no way alters or detracts from the performance of the ignition system with which it is used. Also, the electrical circuitry of the present device includes a unique protective feature for insuring that any unduly large voltages will not be present in the delicate sensing and indicating portions of the tachometer. This eliminates possible damage to the meter movement providing the visual indication of the speed of the engine.

These and other desirable objects and advantages will become increasingly apparent upon examination of the following specification and its appended claims, when taken in conjunction with the accompanying drawings, in which is illustrated a preferred embodiment of the tachometer of the invention.

Figure 2:
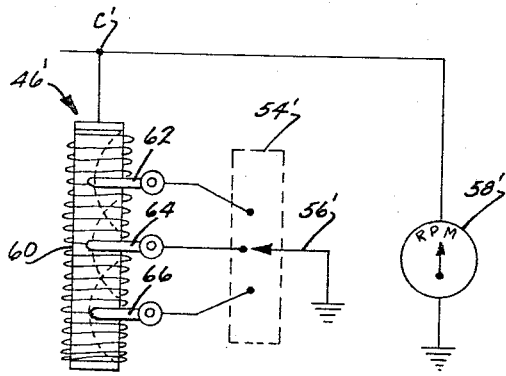

In the drawings:

FIG. 1 is a schematic representation of the invention, in circuit with a typical enviroment; and FIG. 2 is a further embodiment of a portion of the circuit shown in FIG. 1.

Briefly stated, the present invention is an electrically operated engine tachometer which senses electrical pulses having a known relationship to the speed of an engine, such as those present in its ignition system, and which provides a constant visual indication of the instantaneous speed of the engine. The present device preferably utilizes a large "spike" of current which occurs in the coil of a battery-coil ignition system each time the secondary winding of the coil fires one of the spark plugs, due to the reactive energy-storing qualities of the coil. This large spike of current is first smoothed and is then shaped by what is basically an electronic integrating network. These are the preliminary steps in reading the average value of the continuous series of such spikes which occur in various changing frequencies during normal engine operation. The train of pulses is coupled to a pair of diode networks, which protect the indicating meter in two ways. First, they insure the unidirectional character of the current, and second they prevent the passage of any possible surges or other unduly large voltages which might in operation occur. The tachometer circuit further includes a plurality of resistance elements, and a movable contact by which any one of these may be connected across the meter. These resistances are carefully chosen so that when each is used with an engine having a particular number of cylinders, a predetermined fraction or percentage of the total current flowing in the circuit will be shunted through that resistance and around the meter, leaving a fraction of current flowing through the meter that is just large enough to cause a desired deflection of the meter at a given speed of the engine. Once the correct value of these various resistances is calculated, the tachometer will by a simple adjustment of the resistive network correctly read the operating speed of any engine having any number of cylinders.

Referring now in more detail to the drawing, a typical automotive ignition system is shown in the dashed enclosure designated 10 of FIG. 1. This includes a battery 12, an ignition switch 14, and a transformer or "coil" 16, having a primary winding 18 and a secondary winding 20. The ignition system 10 further includes a set of breaker points 22 and a capacitor 24 in parallel with primary winding 18, together with a mechanical cam or rotor 26. The rotor 26 serves to make and break the contact of the points 22. Finally, the ignition system 10 includes a spark plug 28, which is in the circuit of the secondary winding 20.

The tachometer circuit is shown within the dashed enclosure 30. The first portion of this circuit includes a series inductor or "choke" 32, which operates as an input filter for rejecting undesirable high frequencies from the pulses entering the tachometer. Connected in series with choke 32 are a resistor 34, a D.-C. blocking capacitor 36, and a diode rectifier 38. For purposes to be explained subsequently, resistor 34 acts as a current limiting device, and also cooperates with capacitor 36 to form a network having the nature of an integrating circuit. That is, the RC time constant of these two components is large compared to the reciprocal of the pulse frequencies in the range expected to be encountered during operation. Thus, the current pulses present in the tachometer circuit are a function of the integral of the pulses entering the circuit.

Between series resistor 34 and capacitor 36, at circuit point A, a parallel branch including a pair of back-to-back Zener-type diodes 40 and 42 connects to ground. Between series capacitor 36 and diode 38, at circuit point B, a parallel branch including a second diode rectifier 44 is connected in circuit, the cathode of the diode being connected to circuit point B and the anode being connected to ground. Connected to circuit point C, at the cathode of series rectifier 38, is yet another parallel branch designated generally as 46. This branch includes a plurality of parallel resistance elements such as those designated 48, 50, and 52. These resistors all have one of their terminals connected to circuit point C, and they all have their other terminal connected to a single-pole multiple-throw switch designated 54. Switch 54 has a sweep arm 56 for making contact with a single desired one of the resistors connected to the switch, thereby placing that resistor in circuit between point C and ground.

A meter 58 calibrated in revolutions per minute is connected across (parallel to) resistance network 46, so as to share with the resistance network the total current present in the circuit at point C. Consequently, the value of the particular resistance element 48, 50, or 52 which happens to be connected in circuit by sweep arm 56 determines the proportions into which the total circuit current is to be divided, and how much current will flow through the meter. Meter 58 may be of any conventional type, but preferably has a movement which is dampened sufficiently to enable the meter to steadily indicate the average value of the pulses flowing through it, without undue fluctuation of the indicating needle.

In the following description of the invention's operation it is assumed that the ignition system 10 is operating normally, and that the engine associated with it has been started and is running at a given rate of speed. In this condition, ignition switch 14 will have been closed so that current may flow in primary winding 18, and cam 26 will be steadily rotated by the engine, thereby making and breaking ignition contacts 22 and consequently interrupting the flow of current through primary winding 18, all in a known manner.

Each time contacts 22 are closed, a pulse of current flows through the primary winding and the points 22 to ground, which flow of current is interrupted by the operation of the cam 26 breaking the contact of the points. By the transformer action of ignition coil 16, the pulse of current in primary winding 18 induces a very large pulse in secondary winding 20, which is sufficient to fire the engine spark plugs such as 28. Each time this large pulse occurs in the secondary winding it creates an electromagnetic field of force about the winding. Consequently, each time the spark plug 28 is fired and the igniting pulse disappears, the field of force surrounding secondary winding 20 collapses. This induces a sharp spike of current of a peak magnitude which often exceeds 160 volts, back into primary winding 18. In the typical ignition system this spike of electrical energy is largely ignored, and is dissipated between the turns of wire in primary winding 18 and ignition system capacitor 24. When the tachometer of the present invention is connected to such an ignition system in the manner shown, however, this reactive spike of energy is what energizes the tachometer circuit.

The spike from the ignition system 10 enter tachometer circuit 30 at input filter choke 32, which tends to eliminate from the sharp spike waveform a number of sharply-peaked high frequency noise variations. Accordingly, the spike waveform appearing across series resistor 34 is considerably smoother than that entering the circuit, and as a result of this resistor somewhat attenuated in magnitude, although still relatively large. Zener diodes 40 and 42 act as clippers at this point, acting to trim the sharp spike by flattening its top at a predetermined relatively low level, conducting to ground all voltage exceeding this level. Thus, the resulting wave is always of an essentially uniform magnitude and this is not changed at all by differences in the size of the ignition voltage. Consequently, it makes no difference whether the tachometer is used with a six or a twelve volt ignition system. It operates equally well with either.

The pulse of uniform magnitude present at circuit point A as a result of the operation of diodes 40 and 42 is impressed directly upon one side of capacitor 36, which also serves to block the direct ignition voltage out of the tachometer circuitry. Now, if the pulse is a positive one, capacitor 36 charges with a plus-to-minus potential across it. This requires a flow of electrons through the meter from ground, and conventional current flow is said to be through diode 38 (diode 44 blocking any such flow through it) and the resistances network 46 and meter 58, causing the latter to indicate a reading thereupon. Once the excitation pulse has passed, the negative charge on capacitor 36 discharges through diode 44, diode 38 blocking a flow under such a potential.

If the ignition system upon which the tachometer is being used is of the opposite polarity, however, the excitation pulse from the coil 16 will be of negative polarity. Such a pulse will be clipped by zener diodes 40 and 42 at the same absolute magnitude as the positive pulse previously discussed, and consequently capacitor 36 is charged with the same potential as in the previous example, except in the opposite direction, namely, minus-to-plus. The positive charge now on this capacitor produces a flow of electrons away from it. Diode 38 blocks such a flow, but diode 44 readily permits it. This produces conventional current flow from ground through diode 44. The charge on capacitor 36 cannot discharge through diode 44 after the excitation pulse has passed however, but it is now free to pass through diode 38 and resistance network 46 and meter 58, producing a displacement of the indicating needle. Consequently, whatever polarity of ignition system is used, it will be seen that the tachometer 30 produces the same accurate reading for the same engine speed from meter 58.

The shape of the pulse which actually causes displacement of the needle in meter 58 is clearly determined by the charging and discharging times of capacitor 36, together with the shape of the pulse impressed upon this capacitor, of course. As has been previously stated, capacitor 36 and resistor 34 are selected to form an integrating circuit. This circuit produces at circuit point C a wave having a much more regular shape than the sharp spike entering the tachometer, and the integrated pulse at point C is thus shaped to enable meter 58 to continuously average the pulses into a smooth and steady reading.

Since the engine is running and the ignition system 10 is in continuous operation, the reactive pulses from the primary winding 18 which form the input to the tachometer circuit 30 appear in a continuous succession. The frequency of this succession of pulses depends first on the speed of the engine, and secondly on the number of its cylinders, since each cylinder will fire once for a predetermined number of revolutions of the engine determined by the basic type of engine (as, for example, two cycle marine engines or four cycle auto engines). This train of pulses results in a current flow through resistive network 46 whose magnitude is a function of the magnitude of the pulses, their frequency, and the particular resistive value selected by movable contact 56 within switch 54. The fraction of total circuit current remaining which does not flow through network 46 flows through meter 58, connected directly across the resistor network. As previously stated, the meter is an averaging device. Further, it is calibrated to read out directly in revolutions per minute, and the resistors 48, 50, 52, etc. are carefully selected so as to produce a precise deflection of the meter for a given engine speed. Consequently, the faster the engine is running, the higher the frequency of the pulses appearing at circuit point C, and the higher is the average of the pulses flowing through meter 58 over a unit of time. Therefore, meter 58 accurately and steadily indicates the correct instantaneous speed of the engine.

Unlike previous electrical tachometers, each individual resistor 48, 50, and 52 in the network 46 is selected for use with one given type of engine having a particular number of cylinders. Furthermore, each of these resistors is carefully selected to closely relate to the other resistors in the particular group to be used in a single tachometer. More specifically, it has been determined empirically that for accurately indicating engine speed upon a 500 microamp meter chosen as the meter 58, using zener diodes having a breakdown point of six volts, a four cylinder engine requires a resistor having a value of 134.25 ohms, a six cylinder engine requires a resistor having a value of 88.5 ohms, and an eight cylinder engine requires a reresistor having a value of 52.7 ohms. What is more, these resistors as a group may not vary in value by more than two percent. While precision resistors are available which do not exceed this tolerance, it is the entire tolerance of the tachometer circuit which is involved, and this seems always to add up to more than two percent. Moreover, special resistors are prohibitively expensive and cannot be used competitively in this application. Consequently, commercial grades of resistors having the non-standard values given above as their nominal resistance must be purchased. Since such components have tolerances which range from plus or minus five to ten percent, they must individually be carefully screened and matched into groups wherein each individual resistor varies from one of the above nominal values by the same amount, or at least by a difference of no more than two percent. Thus, each finished tachometer may be used on any or all of the different kinds of engines typically found, and with the same extremely accurate speed reading in each case. All that is necessary in the case of each such engine is a simple manual adjustment of switch 54, which moves sweep arm 56 to connect a different one of the carefully selected resistors 48, 50, or 52 into the circuit, thereby instantly calibrating the meter to the particular engine involved.

*Modification*

From the previous description of the nature of my tachometer circuit and of its operation, it will be appreciated that embodiments of the resistive network 46 other than that shown in FIG. 1 are possible, and that if price is no objection, the somewhat painstaking selection of resistors noted above would not be necessary. In order to produce an instrument having the added features of the present one which will effectively compete on the open market, however, it is desirable that all possible economies be realized.

One way other than that previously described to so economize while still providing the extra features and good accuracy as well is by the components forming the circuit of FIG. 2. In this circuit, point C' analogizes to point C in FIG. 1, resistive network 46' relates to network 46 of FIG. 1, switch 54' relates to switch 54, movable contact 56' relates to contact 56, and meter 58' relates to meter 58. The interconnection of each of these sets of components is electrically the same as in FIG. 1, and either of the two circuits operates in the manner described above. The difference between the two circuits is in the resistive network 46'.

I have discovered that an even more economical version of such a network may be provided by modifying a conventional wire wound resistor such as that shown at 60, having a resistance value somewhat greater than the highest one required. This single resistor is mounted in a suitable manner to the tachometer chassis, and a plurality of sweep arms such as 62, 64 and 66 are also attached thereto such that each arm covers a predetermined resistance range along the length of the resistor. Each sweep arm is connected to one of the contacts in switch 54'. Thus, movable contact 56' of the switch may be used to select a single resistance value from the network 46' thereof, in the same manner that switch 54 in FIG. 1 selected a single resistance from network 46 therein. Furthermore, the sweep arms 62, 64 and 66 may be readily adjusted on the production line to carefully calibrate the various resistances in the network 46' of each tachometer.

In such a manner, random variances in individual tachometer circuit performance due to the tolerances of its several components may be taken into account and compensated for once and for all, and the actual cost of producing the unit is lowered. Although the basic wire-wound resistor indicated at 60 may be purchased commercially, the network represented by 46' including sweep arms 62, 64 and 66 must be constructed by the builder of the tachometer, since no similar unit is commercially available and I have never seen such a component in any other circuit.

From the foregoing, it will be readily apparent that the tachometer of the present invention is a truly universal device, which may be installed upon any engine having this general type of ignition system, whether it be automotive, marine, aircraft, or other application. All that is necessary is to use switch 54 or switch 54' in order to select the terminal of resistor network 46 or 46' which corresponds to the number of cylinders in the particular engine. Indeed, the device is so flexible that not only may an owner transfer it easily upon buying, selling or otherwise changing automobiles, he may actually transfer it from one type vehicle to another, as from an automobile to a boat, so that by owning only one of the instruments herein disclosed and using it to its fullest potential, one may avoid the unnecessary expense and trouble of buying several of the previous conventional tachometer units.

Although I have endeavored to set forth the embodiments of my invention which I most prefer and which have proven very satisfactory in actual use, it may be that modifications and changes in certain specific elements and components of the device illustrated herein will occur to those skilled in the art following a consideration of the foregoing specification and the following claims. Accordingly, such modified versions of the invention are to be considered as a part of it, unless they are expressly excluded by the claims appended blow.

I claim:
1. An electrically operated engine tachometer, comprising: a source of electrical impulses which have a known relationship to the speed of an engine and to the number of its cylinders; a filter network including a series-connected choke for initially receiving said impulses and for smoothing and shaping the same; a series circuit branch having one end coupled to said filter network and including a resistor, a capacitor, and a first unidirectionally conductive component connected to conduct impulses having a first polarity and to block impulses having an opposite polarity; a second unidirectionally conductive component connected from a point in said series circuit branch to ground potential, to conduct impulses therebetween having a polarity opposite said first polarity; a meter connected from the end of said series circuit branch opposite said one end thereof to ground potential, for steadily indicating a value proportional to the average of impulses conducted to such meter; and a composite resistor means connected across said meter for causing a given deflection of the latter at a given engine speed, said composite resistor comprising a single resistor body having a plurality of sweep arms in spaced contact along such resistor body for tapping therefrom a plurality of separate and different resistance values and switching means having a movable contact for selectively connecting different ones of said resistance values in circuit with said meter, each of said values selected to produce the same current flow through said meter at a given engine speed for an engine having a given number of cylinders as the other resistance values do at that same speed for engines having other and different numbers of cylinders, whereby the speed of an engine will be correctly indicated by said meter regardless of the number of cylinders in the engine.

2. The engine tachometer recited in claim 1, further including voltage limiting means connected from a point in said series circuit to ground potential for limiting the magnitude of pulses of both said first polarity and said other polarity conducted through said series circuit branch to said meter.

3. The engine tachometer recited in claim 2, wherein said voltage limiting means comprises a pair of unidirectionally conductive component elements connected in back-to-back series relation.

References Cited
UNITED STATES PATENTS

| | | | |
|---|---|---|---|
| 1,676,869 | 7/1928 | Richter | 338—137 |
| 2,513,668 | 7/1950 | Parker | 324—70 |
| 3,219,926 | 11/1965 | Dion | 324—70 |

OTHER REFERENCES

"Knight Kit Tachometer," Radio Electronics, February 1962, pp. 42, 43.

Zener Diode and Rectifier Handbook, 2nd Edition, 1961, pub. by Motorola, pp. 112, 113.

RUDOLPH V. ROLINEC, *Primary Examiner.*

WALTER L. CARLSON, *Examiner.*

M. J. LYNCH, *Assistant Examiner.*